(12) United States Patent
Shimizu

(10) Patent No.: US 8,088,504 B2
(45) Date of Patent: Jan. 3, 2012

(54) MAGNETIC RECORDING MEDIUM AND MAGNETIC RECORDING AND REPRODUCING DEVICE USING THE MAGNETIC RECORDING MEDIUM

(75) Inventor: Kenji Shimizu, Ichihara (JP)

(73) Assignee: Showa Denko K.K., Tokyo (JP)

( * ) Notice: Subject to any disclaimer, the term of this patent is extended or adjusted under 35 U.S.C. 154(b) by 67 days.

(21) Appl. No.: 12/158,552

(22) PCT Filed: Nov. 2, 2006

(86) PCT No.: PCT/JP2006/322415
§ 371 (c)(1),
(2), (4) Date: Jun. 12, 2009

(87) PCT Pub. No.: WO2007/074585
PCT Pub. Date: Jul. 5, 2007

(65) Prior Publication Data
US 2009/0296276 A1 Dec. 3, 2009

(30) Foreign Application Priority Data
Dec. 27, 2005 (JP) ................... 2005-373681

(51) Int. Cl.
*G11B 5/66* (2006.01)
(52) U.S. Cl. ...................................... 428/831
(58) Field of Classification Search ........... None
See application file for complete search history.

(56) References Cited

U.S. PATENT DOCUMENTS

| | | | |
|---|---|---|---|
| 6,183,893 B1* | 2/2001 | Futamoto et al. | 428/831.2 |
| 6,592,976 B2* | 7/2003 | Futamoto et al. | 428/212 |
| 7,524,570 B2* | 4/2009 | Dai et al. | 428/827 |
| 2002/0146594 A1* | 10/2002 | Takahashi et al. | 428/694 TS |
| 2004/0106010 A1 | 6/2004 | Iwasaki et al. | |
| 2004/0224185 A1* | 11/2004 | Nakamura et al. | 428/694 TS |
| 2005/0196641 A1 | 9/2005 | Shibata | |
| 2005/0249870 A1 | 11/2005 | Kawada | |
| 2006/0275629 A1* | 12/2006 | Ikeda et al. | 428/831.2 |

FOREIGN PATENT DOCUMENTS

| | | |
|---|---|---|
| JP | 2669529 B2 | 10/1997 |
| JP | 2003-123239 A | 4/2003 |
| JP | 2004-178748 A | 6/2004 |
| JP | 2004-265516 A | 9/2004 |
| JP | 2005-243093 A | 9/2005 |
| JP | 2005-302109 A | 10/2005 |

* cited by examiner

Primary Examiner — Holly Rickman
(74) Attorney, Agent, or Firm — Sughrue Mion, PLLC

(57) ABSTRACT

A magnetic recording medium A is provided on a non-magnetic substrate 1 with at least a soft under layer α, an under film 5, an intermediate film 6 and a perpendicular magnetic recording film 7. The soft under layer a is a soft magnetic film having an amorphous structure. The under film 5 is formed of an Ni—W alloy. The intermediate film 6 is formed of an Ru alloy. In the Ni—W alloy, the Ni content is 80 atom % or more, and the W content is 20 atom % or less and preferably in the range of 1 atom % to 12 atom %. A magnetic recording and reproducing device 12 equipped with the magnetic recording medium A is excellent in productivity and capable of recording and reproducing information of high density.

11 Claims, 2 Drawing Sheets

MAGNETIC RECORDING MEDIUM AND MAGNETIC RECORDING AND REPRODUCING DEVICE USING THE MAGNETIC RECORDING MEDIUM

CROSS REFERENCE TO RELATED APPLICATIONS

This application is an application filed under 35 U.S.C. §111(a) claiming priority of Japanese Patent Application No. 2005-373681 filed Dec. 27, 2005 pursuant to 35 U.S.C. §111(b).

TECHNICAL FIELD

This invention relates to a magnetic recording medium and a magnetic recording and reproducing device using the magnetic recording medium and more particularly to a perpendicular magnetic recording medium of high recording density.

BACKGROUND ART

The perpendicular magnetic recording system is a suitable system for improving the areal recording density because, in consequence of causing the easy axis of magnetization of the magnetic recording layer heretofore laid in the in-plane direction of the medium to lie in the vertical direction of the medium instead, the demagnetizing field in the neighborhood of the magnetization transitional region constituting the boundary between adjacent recording bits is decreased and therefore the magnetostatic stability is increased and the resistance to thermal fluctuation is enhanced in accordance as the recording density is heightened.

When a soft under layer made of a soft magnetic material is interposed between a substrate and a perpendicular magnetic recording film, the resultant product is capable of functioning as a so-called vertical two-layer medium and acquiring a high recording ability. In this case, the soft magnetic soft under layer is fulfilling the role of refluxing the recording magnetic field from the magnetic head and is enabled to enhance the recording and reproducing efficiency.

Generally, as under films, various kinds of materials have been proposed. For example, Ti alloys (refer to Japanese Patent No. 2669529, for example), Ni—Fe—Cr alloys (refer to WP-A 2003-123239, for example), etc. having an hcp or fcc structure and Ta or other elements having an amorphous structure may be cited.

Since the under film is a governing element that determines the particle diameters and orientations of the intermediate layer and magnetic recording layer stacked thereon, the selection of the material therefore proves to be very important in order to determine the recording and reproducing characteristics of the magnetic recording medium.

The interposition of the under film between the soft under layer and the magnetic layer results in causing the distance between the magnetic head and the surface of the soft under layer to be increased by the thickness of the under film. For the purpose of enabling the writing to be made fully satisfactorily, therefore, the necessity arises that the soft under layer be given an adequate thickness. Since the under film uses a material possessing a soft magnetic property, however, it is enabled to fulfill the role of a soft under layer and control the crystal orientation of the intermediate layer disposed thereon.

The structure of medium proposed heretofore is not sufficient to obtain a magnetic recording medium excelling in the recording and reproducing property. Thus, the desirability of a magnetic recording medium that solves this problem and allows easy manufacture as well has been finding recognition.

This invention has been proposed in view of the state of affairs and is aimed at optimizing the material for the under film and thereby providing a magnetic recording medium and a magnetic recording and reproducing device excellent in productivity and capable of recording and reproducing information of high density.

For the purpose of accomplishing the object mentioned above, this invention has adopted the following configurations.

DISCLOSURE OF THE INVENTION

The first aspect of the invention is directed to a perpendicular magnetic recording medium provided on a non-magnetic substrate with at least a soft under layer, an under film, an intermediate film and a perpendicular magnetic recording film, wherein the soft under layer is a soft magnetic film having an amorphous structure, the under film is formed of an Ni—W alloy, and the intermediate film is formed of a Ru alloy.

In the second aspect of the invention that includes the configuration of the first aspect, the Ni—W alloy has an Ni content of 80 atom % or more and a W content of 20 atom % or less.

In the third aspect of the invention that includes the configuration of the first or second aspect, the W content of the Ni—W alloy is in the range of 1 atom % to 12 atom %.

In the fourth aspect of the invention that includes the configuration of any one of the first to third aspects, the Ni—W alloy has a saturation flux density Ms of 50 emu/cm$^3$ or more.

In the fifth aspect of the invention that includes the configuration of any one of the first to fourth aspects, the Ni contained in the under film has a crystal lattice in Ni (111), the intermediate film has a crystal lattice in Ru (0002) and the crystal lattices have a ratio Ni (111)/Ru (0002) in the range of 0.90 to 0.95.

In the sixth aspect of the invention that includes the configuration of any one of the first to fifth aspects, the under film further contains at least one element selected from the group consisting of B, M, Si and Al.

In the seventh aspect of the invention that includes the configuration of any one of the first to sixth aspects, the under layer has a thickness of 10 nm or less.

In the eighth aspect of the invention that includes the configuration of any one of the first to seventh aspects, the Ru alloy has a $\Delta\theta 50$ of 6° or less.

In the ninth aspect of the invention that includes the configuration of any one of the first to eighth aspects, the soft magnetic film contains a Co—Fe alloy.

In the tenth aspect of the invention that includes the configuration of ninth aspect, the Co—Fe alloy has an Fe content in the range of 5 atom % to 40 atom %.

In the eleventh aspect of the invention that includes the configuration of any one of the first to tenth aspects, the soft under layer has a film thickness in the range of 20 nm to 80 nm.

In the twelfth aspect of the invention that includes the configuration of any one of the first to eleventh aspects, the intermediate film has a thickness of 16 nm or less.

The thirteenth aspect of the invention provides a magnetic recording and reproducing device comprising the magnetic recording medium according to any one of the first to twelfth aspects and a magnetic head that is a magnetic monopole head for enabling information to be recorded in and reproduced from the magnetic recording medium.

This invention, in a perpendicular magnetic recording medium provided on a non-magnetic substrate with at least a soft under layer, an under film, an intermediate film and a perpendicular magnetic recording film, is enabled by giving a soft magnetic film forming the soft under layer an amorphous structure, making the under film of an Ni—W alloy and making the intermediate layer of a Ru alloy to provide a magnetic recording medium and a magnetic recording and reproducing device excellent in productivity and capable of recording and reproducing information of high density.

The above and other objects, characteristic features and advantages of the present invention will become apparent to those skilled in the art from the description made herein below with reference to the accompanying drawings.

BEST MODE FOR CARRYING OUT THE INVENTION

Figure 1:
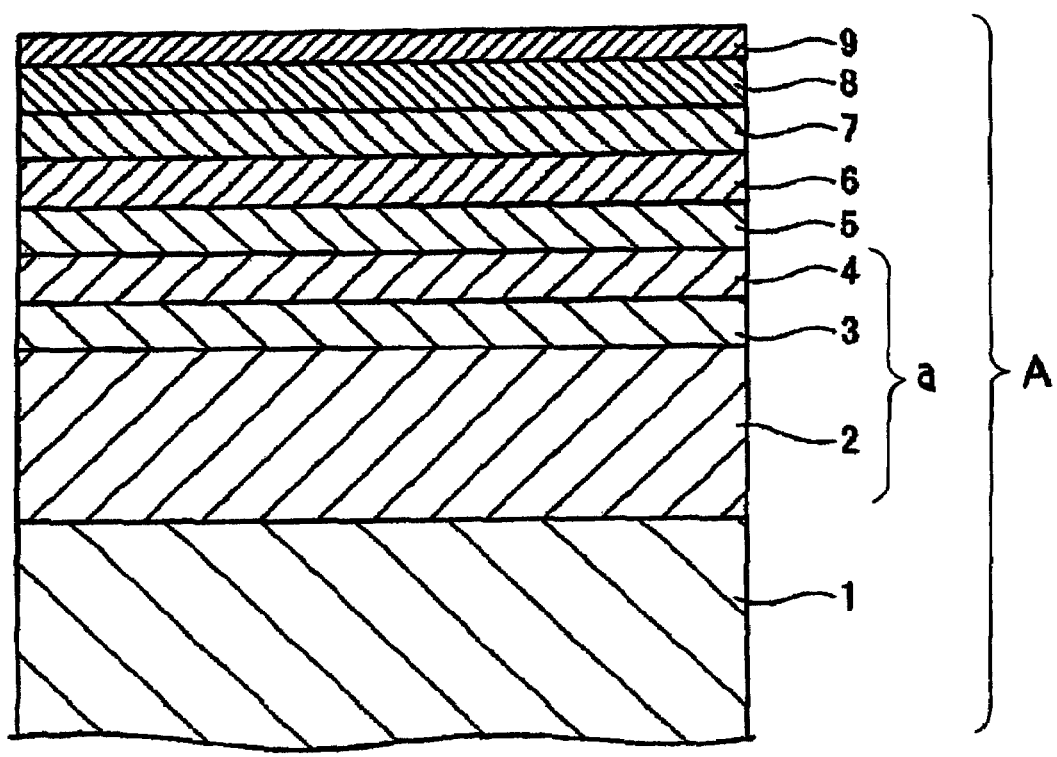
FIG. 1 is a schematic view illustrating the stacked structure of the magnetic recording medium according to the present invention.

FIG. 1 illustrates one example of the magnetic recording medium according to one embodiment of the present invention. A magnetic recording medium A illustrated herein is configured by having a soft under layer a consisting of a first soft magnetic film 2, a Ru film 3 and a second soft magnetic film 4, then an under film 5, an intermediate film 6, a perpendicular magnetic recording film 7, a protective film 8 and a lubricating film 9 sequentially stacked on a non-magnetic substrate 1.

As the non-magnetic substrate 1, metallic substrates made of metallic materials, such as aluminum and aluminum alloys, and non-metallic substrates made of non-metallic materials, such as glass, ceramic, silicon, silicon carbide and carbon, are available.

The glass substrates include those made of amorphous glass and crystallized glass. As the amorphous glass, soda-lime glass and aluminosilicate glass of the all-purpose grade are usable. As the crystallized glass, a lithium-based crystallized glass is usable.

From the viewpoint of heightening the recording density, the non-magnetic substrate 1 is preferred to have an average surface roughness Ra of 0.8 nm or less and more favorably 0.5 nm or less. This is because the flattening consequently occurring in the non-magnetic substrate 1 results in heightening the crystal orientations of the intermediate film 6 and the perpendicular magnetic recording film 7, enhancing the recording and reproducing property and enabling a magnetic head 14 (FIG. 3) to generate low flotation.

The fact that the minute undulation (Wa) of the surface of the non-magnetic substrate 1 is 0.3 nm or less (preferably 0.25 nm or less) proves to be favorable from the viewpoint of suiting the recording performed with high recording density while the magnetic head 12 is retained in low flotation.

The soft under layer α is composed of two layers 2 and 4 of soft magnetic film and Ru film 3 intervening between the two layers of soft magnetic film, for example. The soft magnetic films 2 and 4 overlying and underlying the Ru film 3 are coupled together by AFC (AntiFerromagnetic Couploing).

This configuration enables enhancement of the resistance to the external magnetic field and the resistance to the phenomenon of WATE (Wide Area Track Erasure), i.e. the problem inherent in the perpendicular magnetic recording.

The soft magnetic film is preferably made of a Co—Fe alloy and vested with a saturation flux density Ms of 1.4 T or more. Using the Co—Fe alloy for the soft magnetic film allows realization of a high saturation flux density and using Ni—W for the under film enables acquisition of excellent recording and reproducing property.

The Co—Fe alloy prefers addition of any one element selected from the group consisting of Zr, Ta and Nb. The addition also enables promotion of the amorphousness of the Co—Fe alloy and enhancement of the orientation of the Ni—W. The amount of Zr, Ta and Nb to be added to the Co—Fe alloy is preferred to be in the range of 5 atom % to 15 atom %.

The content of Fe in the soft magnetic film is preferred to be in the range of 5 atom % to 40 atom %. If the content of Fe falls short of 5 atom %, the shortage will be at a disadvantage in lowering the saturation flux density Ms. If the content of Fe exceeds 40 atom %, the excess will be at a disadvantage in deteriorating the quality of corrosiveness.

The thickness of the soft under layer is preferred to be in the range of 20 nm to 80 nm. If the thickness of the soft under layer falls short of 20 nm, the shortage will be at a disadvantage in disabling sufficient absorption of the flux from the magnetic head, preventing the writing from being effected sufficiently and deteriorating the recording and reproducing property. If the thickness of the soft under layer exceeds 80 nm, the excess will be at a disadvantage in markedly deteriorating the quality of productivity.

The soft magnetic film must be in an amorphous structure. This is because the impartation of the amorphous structure prevents the surface roughness Ra from being increased, permits a decrease in the amount of the flotation of the magnetic head and allows addition to the high recording density as well.

Figure 2:
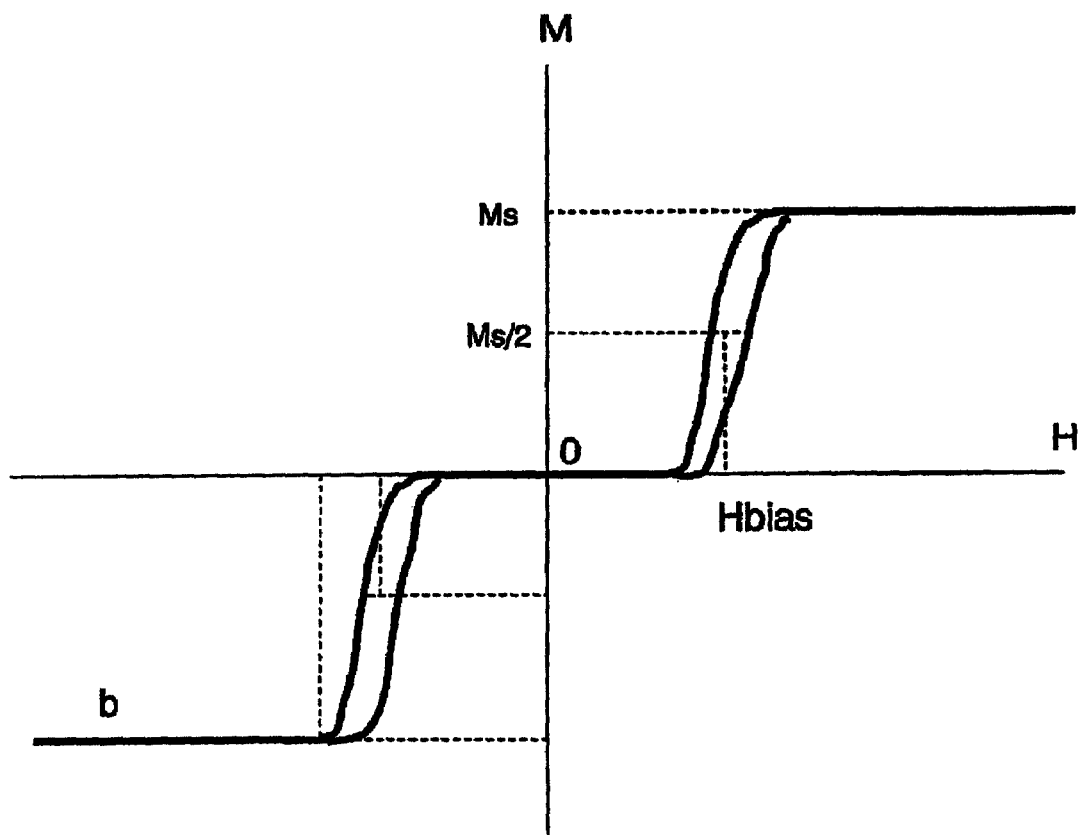
FIG. 2 is a diagram illustrating the Hbias of the present invention.

The Hbias that is the index showing the magnitude of the AFC of the two layers 2 and 4 of soft magnetic film constituting the soft under layer α is preferred to be 80 Oe or more. The Hbias will be explained by reference to FIG. 2. The MH loop of the substrate in-plane component of the soft under layer (the direction of the easy axis of magnetization of the soft magnetic film forming the soft under layer) is illustrated in FIG. 2. On the assumption that Ms denotes the saturation flux density, the magnetic field whose magnitude is Ms/2, i.e. one half of the saturation flux density Ms, is defined as Hbias. The soft under layer can be obtained by using the materials mentioned above for the soft magnetic film and giving to the Ru film 3 interposed between the two layers 2 and 4 of soft magnetic film a prescribed thickness of 0.6 to 0.8 nm. Consequently, it is made possible to enhance the resistance to the external magnetic field and the resistance to WATE.

The coercive force Hc of the soft magnetic film is preferred to be 10 Oe or less (more favorably 5 Oe or less). Incidentally, 1 Oe equals about 79 A/m.

As a means for forming the soft magnetic film, the sputtering method can be used.

In the case of forming the soft under layer, the formation of film is preferred to proceed while the substrate is kept in a state having a magnetic field imparted thereto in the radial direction.

The under film 5 is aimed at controlling the orientation and the crystal size of the perpendicular magnetic recording film 7 to be stacked thereon. The under film is preferably made of an Ni—W alloy, which has an Ni content of 80 atom % or more and a W content of 20 atom % or less. Particularly preferably, the W content is in the range between 1 atom % and 12 atom %.

The main cause that enables the recording and reproducing property to be improved by using the Ni—W under film 5 is as follows. The media using various under films were enlarged by a Transmission Electron Microscope (TEM) into plane observation images, which were used for calculating the sizes of crystals in the relevant magnetic recording films. As a result, it was found that the size of crystal decreased in accordance as the amount of W added was increased. Meanwhile, from the results of XRD, it was found that the dispersion (Δθ50) of the (0002) face indicating the vertical orientation of the Ru intervening film 3 was deteriorated in accordance as the W content increased. It can be inferred that the effect manifested by the decrease of crystal size in improving the recording and reproducing property grows under the condition having the W content of 20 atom % or less and that the deterioration of the recording and reproducing property owing to the deterioration of crystal orientation also grows under the condition having the W content exceeding 20 atom %.

The Ni—W alloy of the under film 5 allows addition of elements with the object of decreasing the crystal size and heightening the matching property of the crystal lattice size with the intermediate film. For the purpose of decreasing the crystal size, B and Mn prove to be particularly favorable. The content of B and Mn is preferred to be 6 atom % or less. For the purpose of heightening the matching property of the crystal lattice size with the Ru intervening film 3, Pt, Mo and Ta may be added.

The saturation flux density of the Ni—W alloy constituting the under film 5 is preferably 50 emU/cm$^3$ or more and more preferably 200 emu/cm$^3$ or more. If it falls short of 50 emu/cm$^3$, the shortage will be at a disadvantage in weakening the function of the under film as part of the soft under layer during the course of writing and consequently inducing deterioration of the recording and reproducing property.

The thickness of the under film 5 is preferably 1 nm or more and 10 nm or less. If the under film has a thickness falling short of 1 nm, the shortage will be at a disadvantage in preventing the under film to fulfill the function thereof sufficiently, disabling acquisition of the effect of minutely decreasing the particle diameter and deteriorating the quality of orientation as well. If the thickness of the under film exceeds 10 nm, the excess will be also at a disadvantage in suffering the crystal size to increase.

The intermediate film 6 is preferably made of Ru or a Ru alloy.

The thickness of the intermediate film 6 is preferably 16 nm or less (more preferably 12 nm or less). This preferability is realized by using a Co—Fe—Hf alloy for the soft magnetic film and an Ni—Fe alloy of a specific composition for the under film. By decreasing the thickness of the intermediate film, it is made possible to shorten the distance between the magnetic head and the soft under layer and impart a precipitous shape to the flux from the magnetic head. As a result, it is also made possible to decrease the thickness of the soft magnetic film further and enhance the productivity of the film.

The perpendicular magnetic recording film 7 possesses an easy axis of magnetization in a direction perpendicular to the surface of the substrate 1. The component elements for this film include at least Co and Pt and they may allow addition of oxides, Cr, B, Cu, Ta and Zr with the object of improving the SNR property.

As the oxides that are allowed to partake in the formation of the perpendicular magnetic recording film 7, SiO$_2$, SiO, Cr$_2$O$_3$, CoO, Ta$_2$O$_3$ and TiO$_2$ may be cited. The volume ratio of the oxide is preferably in the range of 15 vol. % to 40 vol. %. If the volume ratio of the oxide falls short of 15 vol. %, the shortage will be at a disadvantage in preventing the SNR property from being manifested satisfactorily. If the volume ratio of the oxide exceeds 40 vol. %, the excess will be at a disadvantage in disabling acquisition of coercive force conforming to the high recording density.

The nucleation magnetic field -Hn of the perpendicular magnetic recording film 7 is preferably 2.0 kOe or more. If the -Hn falls short of 2.0 kOe, the shortage will be at a disadvantage in giving rise to thermal fluctuation.

The thickness of the perpendicular magnetic recording film 7 is preferred to be in the range of 6 to 20 nm. When the oxide granular layer has a thickness in this range, it proves to be advantageous because it is capable of securing the output sufficiently and incapable of deteriorating the OW property.

The perpendicular magnetic recording film 7 may be formed in a monolayer structure or in a structure of two or more layers made of materials differing in composition.

The protective film 8 is aimed at protecting the perpendicular magnetic recording film 7 from corrosion and preventing the magnetic head from inflicting damage to the surface of the medium A when it contacts the medium and is allowed to use any of the materials heretofore known to the art. For example, materials containing C, SiO$_2$ and ZrO$_2$ are usable. The thickness of the protective film 8 in the range of 1 nm to 5 nm proves to be advantageous in terms of high recording density because this thickness allows the distance between the magnetic head and the medium to be decreased.

For the lubricating film 9, it is advantageous to use materials, such as perfluoro-polyether, fluorinated alcohols and fluorinated carboxylic acids that have been heretofore known to the art.

The magnetic recording medium A in the present embodiment is a perpendicular magnetic recording medium provided on the non-magnetic substrate 1 with at least the soft under layer α, under film 5, intermediate film 6 and perpendicular magnetic recording film 7, wherein the soft magnetic films 2 and 4 forming the soft under layer a is vested with an amorphous structure, the under film 5 is made of a Ni—W alloy and the intermediate film 6 is made of a Ru alloy. The magnetic recording medium A consequently obtained, therefore, is excellent in productivity and capable of recording and reproducing information of high density.

Figure 3:
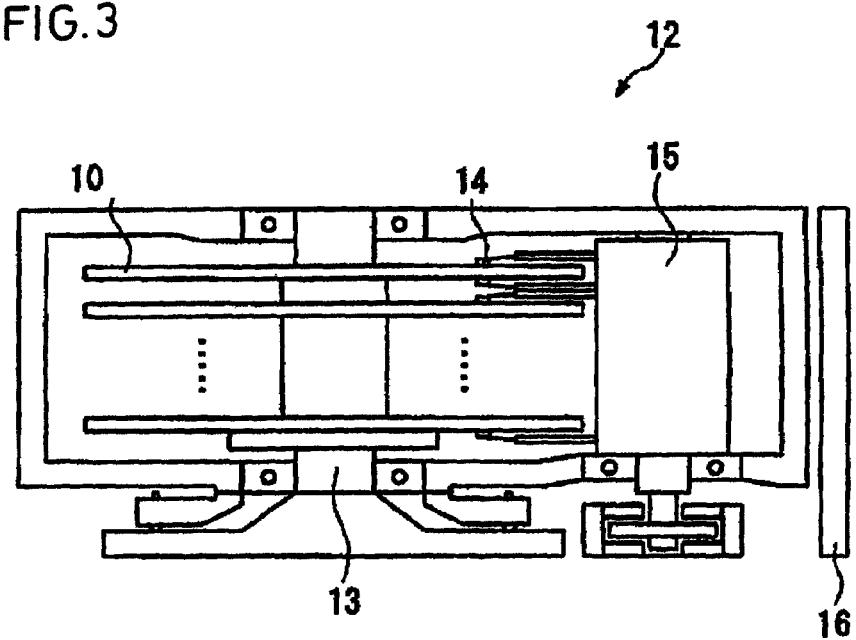
FIG. 3 is a schematic view illustrating the magnetic recording and reproducing device according to the present invention.

FIG. 3 illustrates one example of a magnetic recording and reproducing device 12 using the magnetic recording medium A mentioned above.

The magnetic recording and reproducing device 12 shown herein is provided with a magnetic recording medium 10, a medium-driving part 13 for imparting rotary motion to the magnetic recording medium 10, a magnetic head 14 for causing the magnetic recording medium 10 to record and reproduce information, a head-driving part 15 and a recording-reproducing signal processing system 16. The recording-reproducing signal processing system 16 is adapted to process input data and transmit the resultant recording signal to the magnetic head 14 and process a reproducing signal received from the magnetic head 14 and output the resultant data.

Now, this invention will be explained more specifically below by reference to Examples and Comparative Examples. This invention is not restricted in any way by their descriptions.

EXAMPLE 1

A glass substrate (an amorphous substrate 2.5 inches in diameter, made by MYG Corp. and sold under trademark designation of "MEL3") was used as the non-magnetic substrate 1 and placed in a film-forming chamber of a DC magnetron sputtering device (made by Anelva Corp. and sold under product code of "C-3010"). The interior of the film-forming chamber was evacuated till the degree of vacuum reached $1 \times 10^{-5}$ Pa. On this substrate, the soft under layer a was formed by stacking a film of 71Co-20Fe-5Zr-4Nb (71 atom % of Co, 20 atom % of Fe, 5 atom % of Zr and 4 atom % of Nb) in a thickness of 30 nm as the soft magnetic film 2, a Ru film in a thickness of 0.8 nm as the intervening film 3 and a film of 71Co-20Fe-5Zr-4Nb in a thickness of 30 nm as the soft magnetic film 4. The soft magnetic films 2 and 4 were confirmed by XRD to possess an amorphous structure as a crystal structure.

Subsequently, a film of 80Ni-10W was stacked in a thickness of 5 nm as the under film 5, a film of Ru in a thickness of 12 nm as the intermediate film 6 and a film of 60Co-10Cr-20Pt-10SiO$_2$ in a thickness of 10 nm and a film of 65Co-18Cr-14Pt-3B in a thickness of 6 nm as the perpendicular magnetic recording film 7.

Then, the protecting film 8 was formed in a thickness of 4 nm by the CVD method.

Then, the perpendicular magnetic recording medium A was obtained by forming a film of perfluoro-polyether as the lubricating film 9 by the dipping method.

COMPARATIVE EXAMPLES 1 TO 3

Magnetic recording media were obtained by following the procedure of Example 1 while using Ni-20Fe, Ti and Ta instead as materials for the under film.

The magnetic recording media of Example 1 and Comparative Examples 1 to 3 were evaluated regarding a magnetostatic property and recording and reproducing property. For the evaluation of the magnetostatic property, the Kerr effect measurement system made by NEOARK Corp. was used. For the evaluation of the recording and reproducing property, the read-write analyzer (product code "RWA-1632") and the spin stand (product code "S1701MP") both made by Guzik Technical Enterprises of U.S.A. were used.

The recording and reproducing properties was evaluated by using a magnetic head adapted to effect writing with a monopole magnetic pole and provided in the reproducing part with a GMR element, with the recording frequency set at a linear recording density of 1000 kFCI. The overwrite (OW) property was evaluated by first writing a signal of 500 kFCI, then writing a signal of 67 kFCI thereon and measuring the reissue of the first signal. The results of the evaluations are shown in Table 1 below.

From Table 1 below it was confirmed that Example 1 surpassed Comparative Examples 1 to 3 in SNR and found that the recording and reproducing property excelled even when Ru had a small thickness, such as 12 nm.

TABLE 1

| | Soft magnetic film | | Under film | | |
|---|---|---|---|---|---|
| | Composition (atom %) | Thickness (nm) | Composition (atom %) | Thickness (nm) | Ms (emu/cm$^3$) |
| Ex. 1 | 71Co—20Fe—5Zr—4Nb | 30 + 30 | 90Ni—10W | 5 | 120 |
| Comp. Ex. 1 | 71Co—20Fe—5Zr—4Nb | 30 + 30 | 80Ni—20Fe | 5 | 780 |
| Comp. Ex. 2 | 71Co—20Fe—5Zr—4Nb | 30 + 30 | Ti | 5 | 0 |
| Comp. Ex. 3 | 71Co—20Fe—5Zr—4Nb | 30 + 30 | Ta | 5 | 0 |

| | Intermediate layer | | | Magnetic recording film (Ave. crystal size: nm) | Magnetostatic property (Coercive force: Oe) | Recording and reproducing property (SNR: dB) |
|---|---|---|---|---|---|---|
| | Composition (atom %) | Thickness (nm) | Δθ50 (deg) | | | |
| Ex. 1 | 100Ru | 12 | 3.7 | 6.4 | 4660 | 23.2 |
| Comp. Ex. 1 | 100Ru | 12 | 3.5 | 7.2 | 4380 | 22.1 |
| Comp. Ex. 2 | 100Ru | 12 | 7.2 | 7.5 | 4190 | 19.9 |
| Comp. Ex. 3 | 100Ru | 12 | 6.6 | 6.9 | 3850 | 18.2 |

EXAMPLES 2 TO 12

Magnetic recording mediums were manufactured by following the procedure of Example 1 while changing the composition and the thickness of the Ni—W alloy constituting the under film. The results of evaluation are shown in Table 2 below.

It was found from Table 2 below that Examples using Ni contents of 80 atom % or more and W contents of 20 atom % or less were able to obtain an excellent recording and reproducing property and that Examples using W contents of 1 atom % or more and 12 atom % or less were able to obtain a particularly excellent recording and reproducing property.

TABLE 2

| | Soft magnetic film | | Under film | | |
|---|---|---|---|---|---|
| | Composition (atom %) | Thickness (nm) | Composition (atom %) | Thickness (nm) | Ms (emu/cm$^3$) |
| Ex. 1 | 71Co—20Fe—5Zr—4Nb | 30 + 30 | 90Ni—10W | 5 | 120 |
| Ex. 2 | 7-Co—20Fe—5Zr—4Nb | 30 + 30 | 99Ni—1W | 5 | 510 |
| Ex. 3 | 71Co—20Fe—5Zr—4Nb | 30 + 30 | 94Ni—6W | 5 | 250 |
| Ex. 4 | 71Co—20Fe—5Zr—4Nb | 30 + 30 | 88Ni—12W | 5 | 80 |
| Ex. 5 | 71Co—20Fe—5Zr—4Nb | 30 + 30 | 80Ni—20W | 5 | 0 |
| Ex. 6 | 71Co—20Fe—5Zr—4Nb | 30 + 30 | 60Ni—40W | 5 | 0 |
| Ex. 7 | 71Co—20Fe—5Zr—4Nb | 30 + 30 | 90Ni—8W—2B | 5 | 140 |
| Ex. 8 | 71Co—20Fe—5Zr—4Nb | 30 + 30 | 90Ni—8W—2Mn | 5 | 120 |
| Ex. 9 | 71Co—20Fe—5Zr—4Nb | 30 + 30 | 90Ni—9W—1Si | 5 | 100 |
| Ex. 10 | 71Co—20Fe—5Zr—4Nb | 30 + 30 | 90Ni—8W—2Al | 5 | 120 |
| Ex. 11 | 71Co—20Fe—5Zr—4Nb | 30 + 30 | 90Ni—10W | 1 | 70 |
| Ex. 12 | 71Co—20Fe—5Zr—4Nb | 30 + 30 | 90Ni—10W | 10 | 150 |

| | Intermediate film | | | Magnetic recording film (Ave. crystal size: nm) | Magnetostatic property (Coercive force: Oe) | Recording and reproducing property (SNR: dB) |
|---|---|---|---|---|---|---|
| | Composition (atom %) | Thickness (nm) | Δθ50 (deg) | | | |
| Ex. 1 | 100Ru | 12 | 3.7 | 6.4 | 4660 | 23.2 |
| Ex. 2 | 100Ru | 12 | 3.4 | 6.6 | 4390 | 22.8 |
| Ex. 3 | 100Ru | 12 | 3.6 | 6.4 | 4560 | 22.9 |
| Ex. 4 | 100Ru | 12 | 4.6 | 6.2 | 4710 | 22.9 |
| Ex. 5 | 100Ru | 12 | 5.1 | 5.9 | 4670 | 22.7 |
| Ex. 6 | 100Ru | 12 | 5.8 | 5.7 | 4420 | 22.4 |
| Ex. 7 | 100Ru | 12 | 3.9 | 6.2 | 4580 | 23.4 |
| Ex. 8 | 100Ru | 12 | 3.7 | 6.1 | 4710 | 23.6 |
| Ex. 9 | 100Ru | 12 | 3.6 | 6.3 | 4570 | 23.4 |
| Ex. 10 | 100Ru | 12 | 3.9 | 6.2 | 4620 | 23.5 |
| Ex. 11 | 100Ru | 12 | 4.4 | 6.4 | 4180 | 22.5 |
| Ex. 12 | 100Ru | 12 | 3.3 | 6.6 | 4950 | 22.7 |

EXAMPLES 13 TO 21 AND COMPARATIVE EXAMPLES 4 TO 6

Magnetic recording media were manufactured by following the procedure of Example 1 while changing the materials and the thicknesses of the soft magnetic film and the intermediate film. The results of evaluation are shown in Table 3 below. Examples 13 to 21 were able to obtain excellent properties as shown in Table 3 below.

TABLE 3

| | Soft magnetic film | | Under film | | |
|---|---|---|---|---|---|
| | Composition (atom %) | Thickness (nm) | Composition (atom %) | Thickness (nm) | Ms Emu/cm$^3$ |
| Ex. 1 | 71Co—20Fe—5Zr—4Nb | 30 + 30 | 90Ni—10W | 5 | 120 |
| Ex. 13 | 7-Co—20Fe—5Zr—4Nb | 10 + 10 | 90Ni—10W | 5 | 120 |
| Ex. 14 | 71Co—20Fe—5Zr—4Nb | 40 + 40 | 90Ni—10W | 5 | 120 |
| Ex. 15 | 86Co—5Fe—5Zr—4Nb | 30 + 30 | 90Ni—10W | 5 | 120 |
| Ex. 16 | 51Co—40Fe—5Zr—4Nb | 30 + 30 | 90Ni—10W | 5 | 120 |
| Ex. 17 | 72Co—20Fe—5Ta—3Zr | 30 + 30 | 90Ni—10W | 5 | 120 |
| Ex. 18 | 71Co—20Fe—5Zr—4Nb | 30 + 30 | 90Ni—10W | 5 | 120 |
| Ex. 19 | 71Co—20Fe—5Zr—4Nb | 30 + 30 | 90Ni—10W | 5 | 120 |
| Ex. 20 | 71Co—20Fe—5Zr—4Nb | 30 + 30 | 90Ni—10W | 5 | 120 |
| Ex. 21 | 71Co—20Fe—5Zr—4Nb | 30 + 30 | 90Ni—10W | 5 | 120 |
| Comp. Ex. 4 | 70Co—30Fe | 30 + 30 | 90Ni—10W | 5 | 120 |
| Comp. Ex. 5 | 80Ni—20Fe | 30 + 30 | 90Ni—10W | 5 | 120 |
| Comp. Ex. 6 | 71Co—20Fe—5Zr—4Nb | 30 + 30 | 90Ni—10W | 5 | 120 |

TABLE 3-continued

| | Intermediate layer | | | Magnetostatic property | Recording and reproducing property |
|---|---|---|---|---|---|
| | Composition (atom %) | Thickness (nm) | Δθ50 (deg) | (Coercive force: Oe) | (SNR: dB) |
| Ex. 1 | 100Ru | 12 | 3.7 | 4660 | 23.2 |
| Ex. 13 | 100Ru | 12 | 4.6 | 4510 | 22.8 |
| Ex. 14 | 100Ru | 12 | 3.9 | 4610 | 22.9 |
| Ex. 15 | 100Ru | 12 | 3.7 | 4580 | 22.7 |
| Ex. 16 | 100Ru | 12 | 3.9 | 4710 | 22.8 |
| Ex. 17 | 100Ru | 12 | 3.8 | 4630 | 23.0 |
| Ex. 18 | 80Ru—20Co | 12 | 3.7 | 4550 | 23.4 |
| Ex. 19 | 80Ru—20Al | 12 | 3.9 | 4570 | 23.5 |
| Ex. 20 | 90Ru—10Mn | 12 | 3.7 | 4390 | 23.4 |
| Ex. 21 | 90Ru—10Mo | 12 | 3.8 | 4900 | 23.7 |
| Comp. Ex. 4 | 100Ru | 12 | 6.7 | 5320 | 14.1 |
| Comp. Ex. 5 | 100Ru | 12 | 4.8 | 5180 | 13.9 |
| Comp. Ex. 6 | 100Ni | 12 | — | 1720 | 11.2 |

INDUSTRIAL APPLICABILITY

The magnetic recording medium of the present invention has a film structure excellent in productivity and capable of recording and reproducing information of high density. Therefore, it is made possible to provide an inexpensive a hard disc drive of high recording density.

The invention claimed is:

1. A perpendicular magnetic recording medium provided on a non-magnetic substrate with at least a soft under layer, an under film, an intermediate film and a perpendicular magnetic recording film, wherein the soft under layer is a soft magnetic film having an amorphous structure, the under film is formed of a Ni—W alloy, the intermediate film is formed of a Ru alloy, the W content of the NiW alloy is in a range of 1 atom % to 12 atom %, and the Ni—W alloy has a saturation flux density Ms of 50 emu/cm$^3$ or more.

2. A magnetic recording medium according to claim 1, wherein the Ni contained in the under film has a crystal lattice in Ni (111), the intermediate film has a crystal lattice in Ru (0002) and the crystal lattices have a ratio Ni (111)/Ru (0002) in a range of 0.90 to 0.95.

3. A magnetic recording medium according to claim 1, wherein the under film further contains at least one element selected from the group consisting of B, Mn, Si and Al.

4. A magnetic recording medium according to claim 1, wherein the under film has a thickness of 10 nm or less.

5. A magnetic recording medium according to claim 1, wherein the Ru alloy has a Δθ50 of 6° or less.

6. A magnetic recording medium according to claim 1, wherein the soft magnetic film contains a Co—Fe alloy.

7. A magnetic recording medium according to claim 6, wherein the Co—Fe alloy has an Fe content in a range of 5 atom % to 40 atom %.

8. A magnetic recording medium according to claim 1, wherein the soft under layer has a film thickness in a range of 20 nm to 80 nm.

9. A magnetic recording medium according to claim 1, wherein the intermediate film has a thickness of 16 nm or less.

10. A magnetic recording and reproducing device comprising the magnetic recording medium according to claim 1 and a magnetic head that is a magnetic monopole head for enabling information to be recorded in and reproduced from the magnetic recording medium.

11. A magnetic recording-medium according to claim 7, wherein the Co—Fe alloy contains addition of at least one element selected from the group consisting of Zr, Ta and Nb, and the addition is in a range of 5 atom % to 15 atom %.

* * * * *